US006906313B2

(12) United States Patent
Hayashi (10) Patent No.: US 6,906,313 B2
(45) Date of Patent: Jun. 14, 2005

(54) CASING WITH SHOCK ABSORBING DEVICES FOR IMAGE READING DEVICE (75) Inventor: Eiichi Hayashi, Saitama (JP)

(73) Assignee: Fujinon Corporation, Saitama (JP)

( * ) Notice: Subject to any disclaimer, the term of this patent is extended or adjusted under 35 U.S.C. 154(b) by 303 days.

(21) Appl. No.: 10/367,913

(22) Filed: Feb. 19, 2003

(65) Prior Publication Data

US 2003/0183755 A1 Oct. 2, 2003

(30) Foreign Application Priority Data

Mar. 29, 2002 (JP) ........................................ 2002-096758

(51) Int. Cl.⁷ ................................................ H01J 3/14
(52) U.S. Cl. ...................................... 250/235; 250/239
(58) Field of Search ............................... 250/235, 239, 250/208.1, 234; 358/497, 474

(56) References Cited

U.S. PATENT DOCUMENTS

| 3,504,915 A | * | 4/1970 | Walker ................... 273/157 R |
| 4,926,041 A | | 5/1990 | Boyd |
| 4,982,517 A | | 1/1991 | Bilodeau |
| 5,243,777 A | | 9/1993 | Dedlow |
| 5,253,439 A | | 10/1993 | Shanok et al. |
| 5,969,245 A | | 10/1999 | Chiang |
| 6,124,951 A | | 9/2000 | Chiang et al. |
| 6,172,360 B1 | | 1/2001 | Khovaylo et al. |

* cited by examiner

*Primary Examiner*—Que T. Le
(74) *Attorney, Agent, or Firm*—Arnold International; Jon W. Henry; Bruce Y. Arnold (57) ABSTRACT

A casing for an image-reading device includes a frame made of elongated frame members, such as four frame members that are rigidly connected together. A guide rod may be fixed between a pair of the frame members, and a carriage that supports the optical unit may be guided on the guide rod. A base plate, which is preferably made of glass, is connected to the bottom of the frame. The frame includes shock absorbers distributed evenly around outside side surfaces of the frame or on the bottom of the frame closely adjacent to the outside side surfaces of the frame members. The shock absorbers may be grooves filled with resilient material on the outer sides of the frame members or grooves that are empty or filled with resilient material on the bottoms of the frame members.

20 Claims, 8 Drawing Sheets

CASING WITH SHOCK ABSORBING DEVICES FOR IMAGE READING DEVICE

BACKGROUND OF THE INVENTION

One type of color image-reading device, (i.e., scanner) includes an optical unit which includes a light source, a photoelectric conversion device, and optical elements such as reflective mirrors and lenses that form a light path guiding light reflected from a document to the photoelectric conversion device, that is moved along the document in order to obtain image data from the document. The optical unit is mounted on a carriage that is moved by a driving mechanism that includes a driving belt, such as a timing belt, that is moved back and forth by the output rotation of a driving motor. The carriage is connected to this driving belt to move back and forth with it. The carriage is housed in a casing. In order to guide the movement of the carriage, a guide rod extending in what is termed the length direction of the casing is connected to the carriage.

Figure 8:
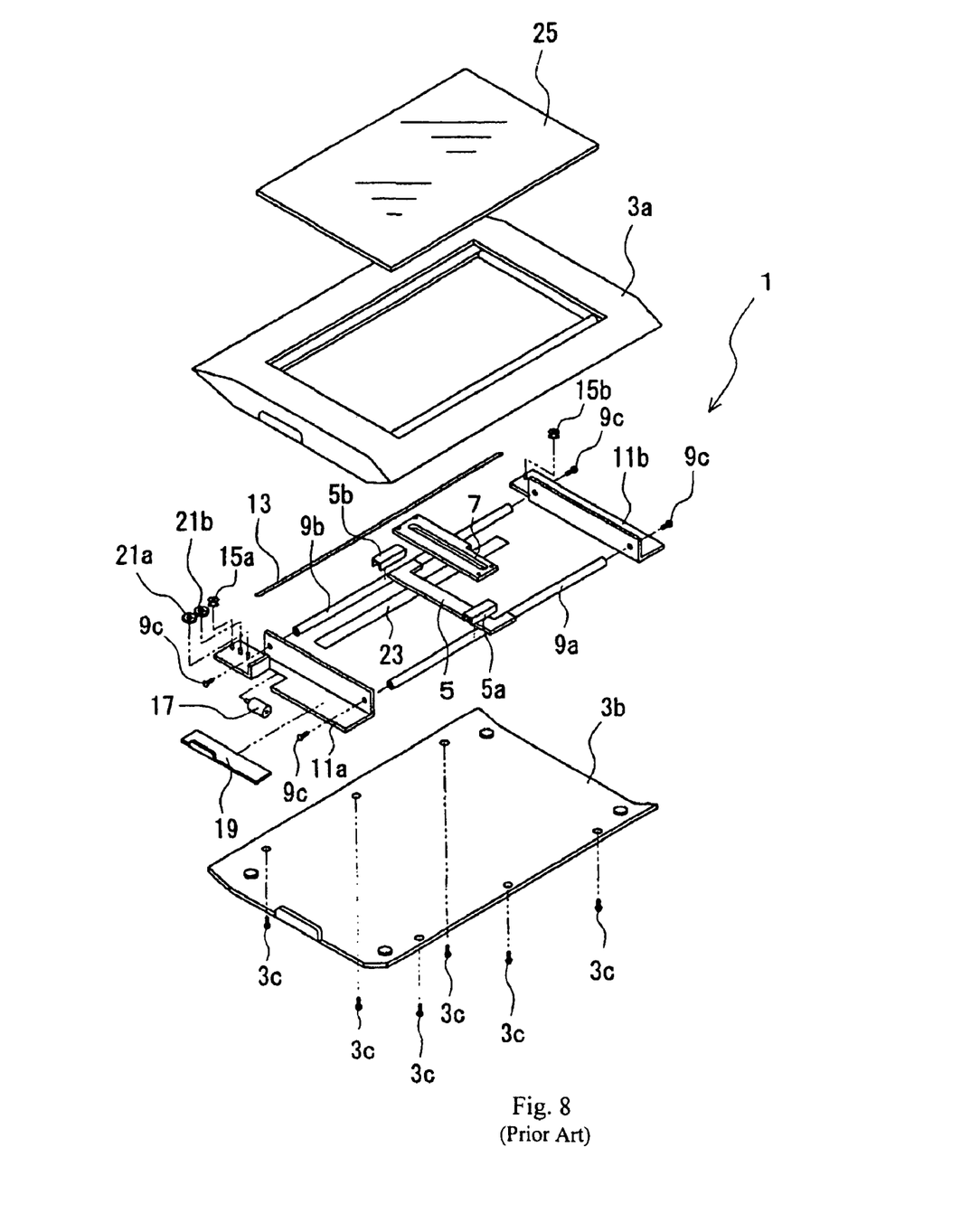
FIG. 8 shows a prior art image-reading device.

FIG. 8 shows an exploded perspective view of the basic structure of an image-reading device 1 that is a conventional example of this type of image-reading device. The image-reading device 1 includes a carriage 5 that is supported on a casing that includes a top base plate 3a and a bottom base plate 3b so that the carriage is free to move in the length direction of the casing. The carriage 5 includes an optical unit 7 that includes a light source, a photoelectric conversion device and optical elements. Movement of the carriage 5 is guided by guide rods 9a and 9b that are on opposite sides of the casing in what is termed the width direction, that is, a direction perpendicular to the length direction, which is the direction of elongation of the carriage when it is mounted in the casing. The guide rods 9a and 9b pass through guide holes in guided parts 5a and 5b provided on the side of the carriage 5. The ends of the guide rods 9a and 9b extend in the length direction and are anchored by screws 9c to brackets 11a and 11b attached to the ends of a bottom plate 3b. On the outside of the guide rod 9b, a drive belt 13 is provided along the guide rod 9b, and the drive belt 13 is anchored to the guided part 5b. This drive belt 13 is looped over a drive-side pulley 15a that is supported on the bracket 11a so as to be free to rotate, and a driven-side pulley 15b that is supported on the bracket 11b so as to be free to rotate. A drive motor 17 and a circuit board 19, which includes the drive circuits for the drive motor 17 and control circuits for the photoelectric conversion device of the optical unit 7 are mounted on the bracket 11a. In addition, appropriate gears 21a and 21b that convert the output rotations of the drive motor 17 to transmit such to the drive-side pulley 15a are supported on the bracket 11a. The optical unit 7 and the circuit board 19 are connected by a flexible circuit board 23.

The top base plate 3a is formed in the shape of a rectangular frame, and a glass plate 25 is mounted inside this frame. A document to be scanned is placed on the glass plate 25. The bottom base plate 3b is formed in a rectangular shape and is attached to the top base plate 3a by screws 3c in order to form a casing that houses the various components of the image-reading device 1.

Both the top base plate 3a and the bottom base plate 3b of the casing are formed by injection molding a material such as plastic (i.e., synthetic resin). However, the image-reading device 1 needs to be of sufficient size to enable the reading of documents recorded on, for example, A4 size paper. Accordingly, in molding the casing, it is necessary to have a metal mold that can mold products of a size sufficient to scan such documents. Additionally, parts of the frame-shaped top base plate 3a and the rectangular-shaped bottom base plate 3b are of complex shapes, and therefore the metal mold structure must be complex. This causes the production costs to increase.

BRIEF SUMMARY OF THE INVENTION

The present invention relates to a casing for an image-reading device that has a simple construction and that reduces production costs by not requiring a complex metal mold or a large scale molding apparatus for molding the parts of the casing. The present invention further relates to such a casing that includes shock absorbing features.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Three preferred embodiments of the casing for an image-reading device of the present invention will now be individually described with reference to the drawings.

Embodiment 1

Figure 1:
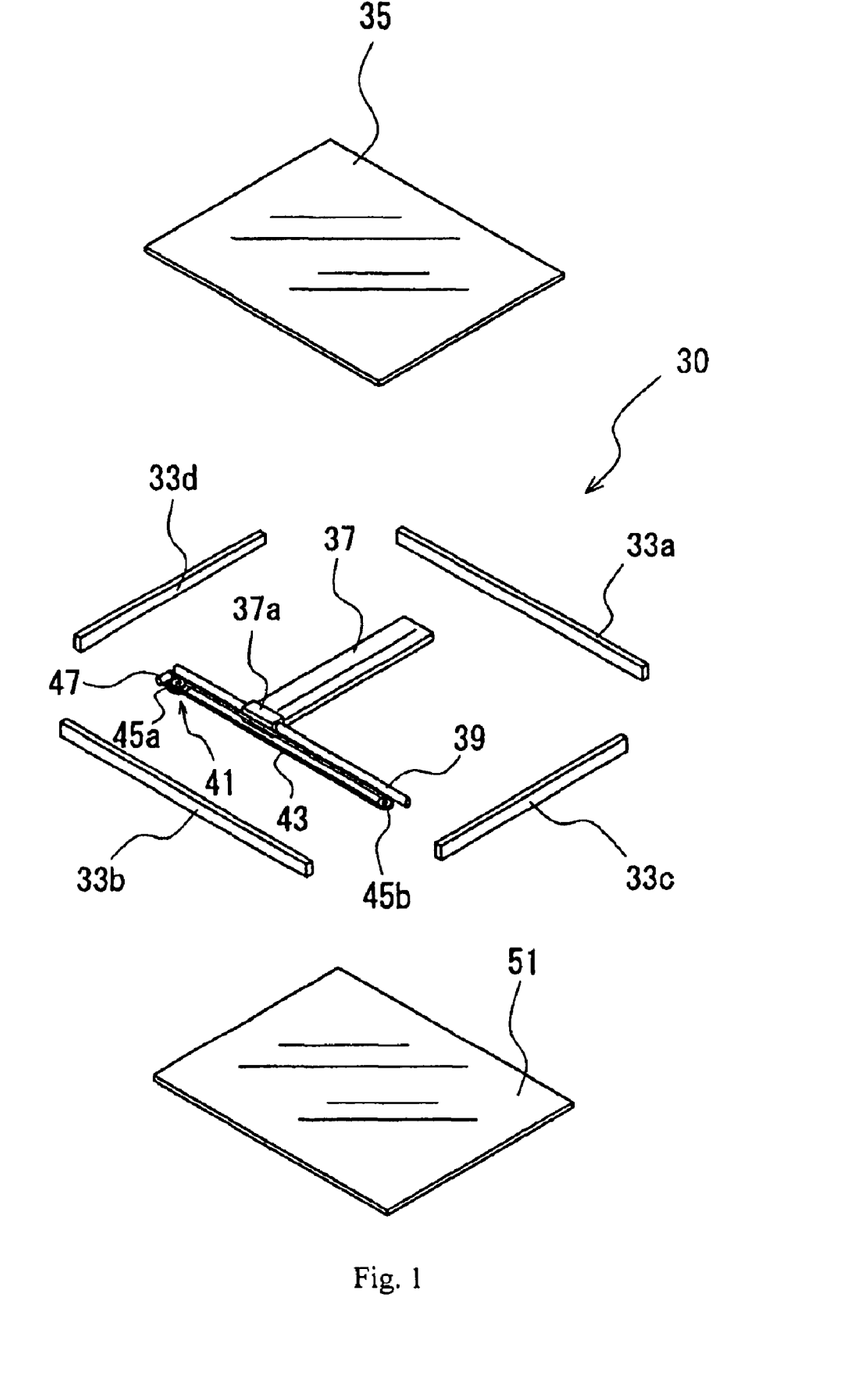
FIG. 1 shows an exploded perspective view of an image-reading device that includes a casing of the present invention.
Figure 2:
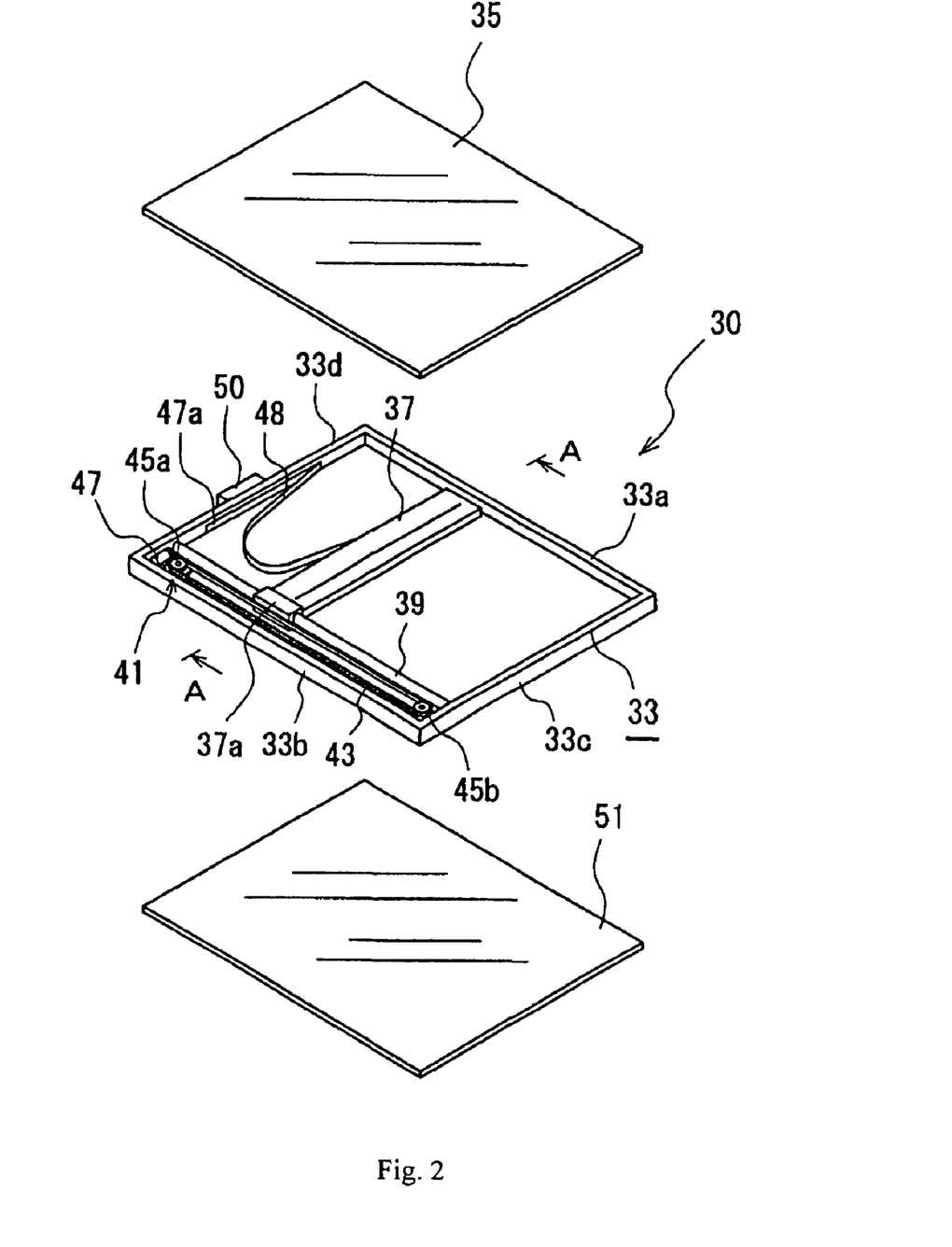
FIG. 2 shows an exploded perspective view of the image-reading device that includes the casing of FIG. 1 partially assembled.
Figure 3:
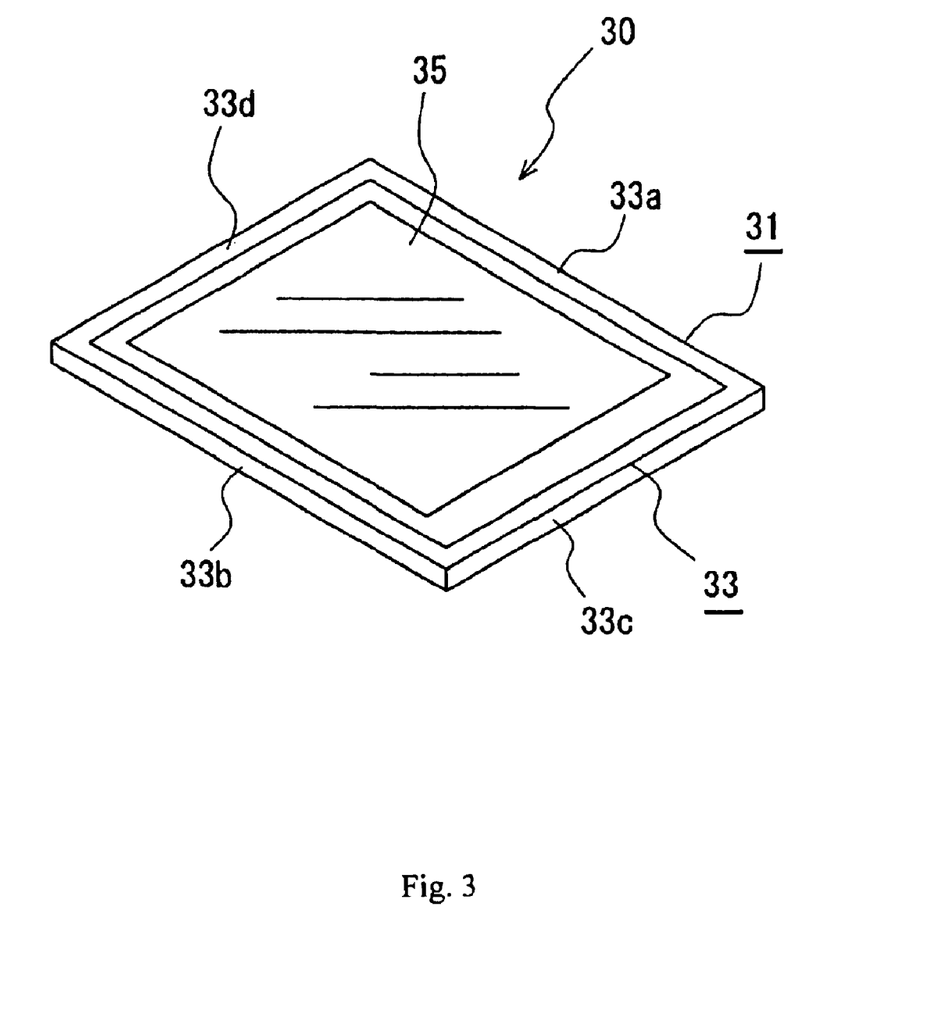
FIG. 3 shows a perspective view of the fully assembled image-reading device that includes the casing of FIG. 1.

The casing for an image-reading device of Embodiment 1 of the present invention will first be described with reference to FIGS. 1–4. FIG. 1 shows an exploded perspective view of an image-reading device 30 that includes the casing according to Embodiment 1 of the present invention. FIG. 2 shows another exploded perspective view of the image-reading device that includes the casing of FIG. 1, but with the frame 33 fully assembled. As shown in FIGS. 1 and 2, the frame 33 includes elongated long frame members 33a and 33b that form side parts along the length direction of the rectangular casing and elongated short frame members 33c and 33d orthogonal thereto, each member being formed separately. These frame members 33a, 33b, 33c and 33d are made of plastic and have been molded into a predetermined shape by injection molding or by similar techniques. These frame members 33a, 33b, 33c and 33d are such that the ends of adjacent framing members mate with each other, as shown in FIGS. 2 and 3, to form a casing 31 of rectangular frame shape that lies generally in a plane when the fully assembled frame 33 is joined with a base plate 51. When the casing 31 is assembled, the base plate 51 lies in a plane that is parallel to the plane in which the frame generally lies. In mating the respective framing members 33a, 33b, 33c, and 33d, structures may be formed, for example, that allow the ends of adjacent frame members 33a, 33b, 33c, and 33d to be mutually inserted into each other, and these members can then be anchored by means of a screw or an adhesive after being inserted into one another. The frame members 33a, 33b, 33c, and 33d are rigidly connected to one another to form the frame 33.

A carriage 37, a guide rod 39 that guides the movement of the carriage, and a drive mechanism 41 for driving the carriage 37, are housed in the casing 31. Incorporated into the carriage 37 is an optical unit (not shown in the drawings) that includes a light source, a photoelectric conversion device and optical elements, such as lenses and reflective mirrors, for creating a light path that guides to the photoelectric conversion device the light emitted by the light source and reflected by a document being scanned. A guided part 37a is provided at one end of the carriage 37, and a guide rod 39 penetrates a guide hole formed in the guided part 37a. The guide rod 39 is supported at both ends by mating with the inside surfaces of the short frame members 33c and 33d. On the inside surfaces of the short frame members 33c and 33d, brackets made of sheet metal (not shown in the drawings) are attached, and the guide rod 39 is supported on these brackets. It is also possible to increase the rigidity of the short frame members 33c and 33d with these brackets. The guide rod 39 extends in the plane defined generally by the frame members 33a, 33b, 33c, and 33d when they are rigidly assembled into the frame 33.

A drive belt 43 is positioned between the guide rod 39 and the elongated long frame member 33b. This drive belt 43 is arranged so as to be looped over a drive-side pulley 45a and a driven-side pulley 45b that are supported in the vicinity of the short frame members 33c and 33d so that the drive belt is free to rotate. The guided part 37a of the carriage 37 is anchored to this drive belt 43. The output rotation of the drive motor 47 is converted and transmitted to the drive-side pulley 45a. This transmission mechanism is preferably housed inside the drive motor 47 to help make the image-reading device 30 more compact.

In addition, as shown in FIG. 2, a circuit board 47a in which the drive circuits of the drive motor 47, and related structures, are included, is attached to the short frame member 33d on the side on which the drive motor 47 is provided. This circuit board 47a, and a circuit board housed in the carriage 37 in which drive circuits for the light source and related structures are incorporated (not shown in the drawings), are connected by a flexible circuit board 48. In addition, an electrical connector 50 is provided on the circuit board 47a. The electrical connector 50 protrudes to the outside of the short frame member 33d. A control circuit board that contains the primary controls for controlling movement of the carriage 37 of the image-reading device 30 is connected via this connector 50. The drive-side pulley 45a, the drive motor 47, and the circuit board 47a are attached to the short frame member 33d and the driven-side pulley 45b is attached to the short frame member 33c, but these may also be attached to the sheet metal brackets (not shown in the drawings) that are attached to these short frame members 33c and 33d.

Figure 4:
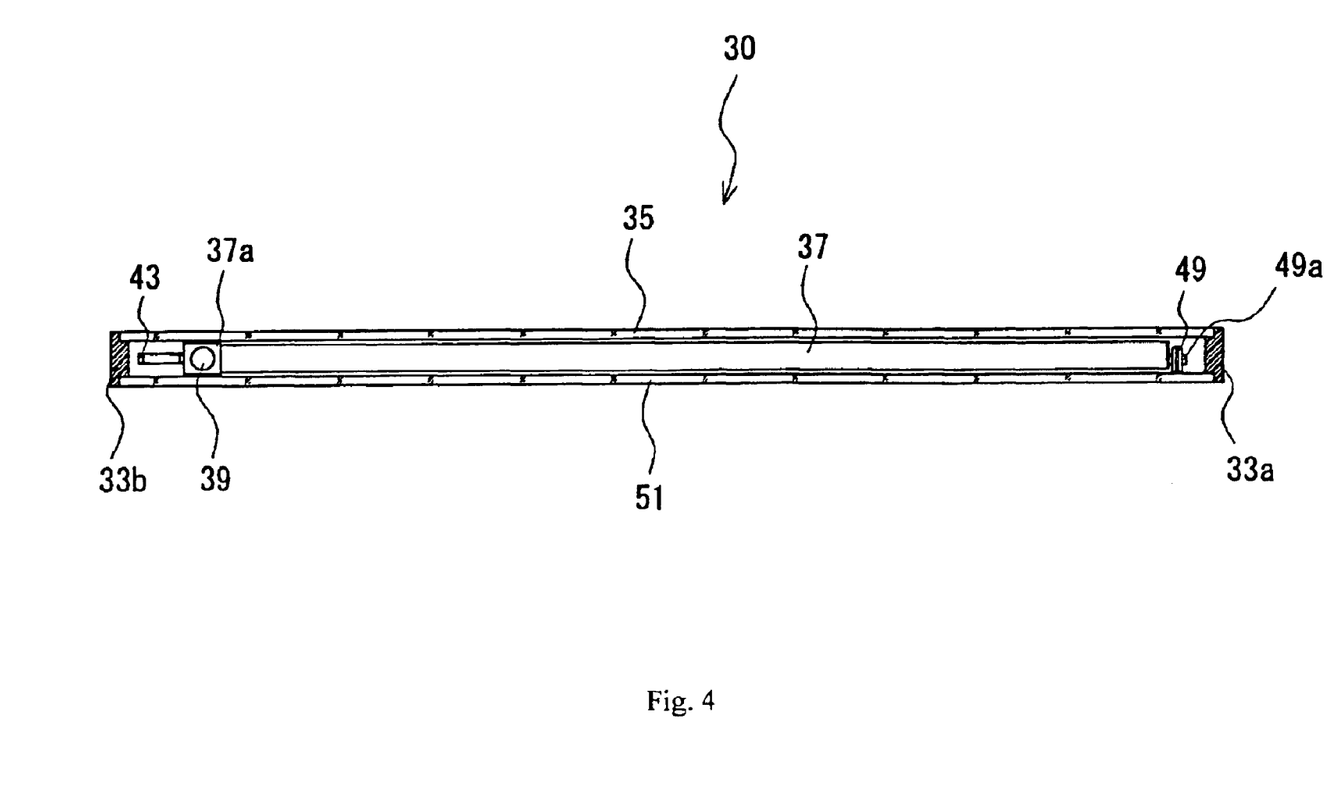
FIG. 4 shows a cross-sectional view of the image-reading device that includes the casing of FIG. 1 taken along the A—A line of FIG. 2 but with top and bottom base plates assembled.

On the opposite end of the carriage 37 from the guided part 37a, a support roller 49 is supported by a support shaft 49a so as to be free to rotate, as shown in FIG. 4. In addition, the base plate 51 is connected to the bottom of the frame 33. In Embodiment 1 of the present invention, the base plate 51 comprises a glass plate, but it may be a metal plate instead of a glass plate. The support roller 49 moves across the top surface of the base plate 51 through the movement of the carriage 37.

The procedure for assembling an image-reading device 30 provided with the casing 31 of the present invention is explained below. First, the guide rod 39 is passed through the guide hole formed in the guided part 37a of the carriage 37. The ends of this guide rod 39 are respectively attached to the short frame members 33c and 33d so that these short frame members 33c and 33d and the guide rod 39 are linked together. The respective ends of the elongated long frame members 33a and 33b are then mated with the respective ends of the short frame members 33c and 33d, and are anchored by means of screws. The driven-side pulley 45b and drive-side pulley 45a are supported on the short frame members 33c and 33d, respectively, and the drive belt 43 is looped over the pulleys 45a and 45b. In addition, the drive motor 47 is attached to the short frame member 33d and the output shaft thereof is engagingly linked to the drive-side pulley 45a. Furthermore, when the drive belt 43 is anchored to the guided part 37a of the carriage 37, the carriage 37 can be placed in its proper position in the casing 31. Before the carriage is assembled in position in the frame 33, the support roller 49 is assembled to the carriage 37 so that it can rest on the base plate 51 when the casing is fully assembled, as shown in FIG. 3. Then, the glass plate 35 is placed on the top of the assembled frame 33, and the base plate 51 is attached to the bottom of the frame 33 so as to form the casing 31. Thus, the assembly of the image-reading device is completed, as shown in FIG. 3. Here, a discussion of the assembly of the control has been omitted because it is not necessary to the description of the invention.

When the drive motor 47 operates, the drive belt 43 is moved back and forth in accordance with the direction of rotation of the drive motor 47. The carriage 37 is engagingly linked to the drive belt 43 via the guided part 37a, and hence the carriage 37 moves back and forth along with the movement of the drive belt 43. The movement of this carriage 37 is guided by continued engagement of the guided part 37a with the guide rod 39 and by the support roller 49 moving on top of the base plate 51. The base plate 51 may be made of a flat plate of glass so that the support roller 49 rotates smoothly and allows the carriage 37 to be moved in a vibration-free manner.

In Embodiment 1 of the present invention, the casing 31 is formed by combining a frame 33 and a base plate 51 that are separate from each other. In addition, the frame 33 is formed by combining various frame members 33a, 33b, 33c, and 33d. Accordingly, the metal molds needed for forming the casing can be made smaller and simpler, and the molding apparatus in general can be smaller. Also, it is possible to reduce the cost of producing the casing and thereby lower the production cost of the image-reading device. Additionally, because it is not necessary to form the base plate 51 of plastic, it is possible to make the base plate 51 of metal or other material with high rigidity so that the rigidity of the casing 31 made by combining the base plate 51 with the frame 33 is increased. Consequently, it is possible to reduce the thickness of the frame 33 in comparison to the thickness of frames of conventional casings in which the frame and the base plate are molded as a single piece, enabling further cost reduction. That enables the image-reading device 30 to be thinner and lighter, increasing the ease of storing and moving the image-reading device 30 between not in use.

Because the frame 33 is formed in a substantially rectangular shape, it is possible to form the frame members 33a, 33b, 33c, and 33d corresponding to the various edges of this rectangle separately and to form them in a simple rod shape. Therefore, it is possible to simplify the structure of the metal mold used in molding the pieces that make up the frame 33 and the molding apparatus in general can be simplified, thereby further reducing production costs. In particular, it is possible to provide the glass plate 35 attached to the top of the frame 33 and the base plate 51 attached to the bottom of the frame 33 with sufficient rigidity that the frame 33 need only support the glass plate 35 and the base plate 51, thereby allowing a simple shape of the frame 33 and the frame members 33a, 33b, 33c, and 33d that, in turn, allows further simplifying of the structure of the molding apparatus.

In particular, if the base plate 51 is made of glass and has the same shape as the glass plate 35, the number of component parts with differences that make up the image-reading device can be reduced and thus production costs can be further lowered. Additionally, because the glass plate 35 has sufficient strength to act as a base plate, it provides the desired rigidity to the casing when the same type of glass plate is used as a base plate 51. Furthermore, the relative ease of producing a surface of the glass plate that is adequately flat makes it unnecessary to undertake surface processing, such as coating processes, that a metal base plate would require to obtain an adequately flat surface, which further reduces production costs.

Embodiment 2

Figure 5:
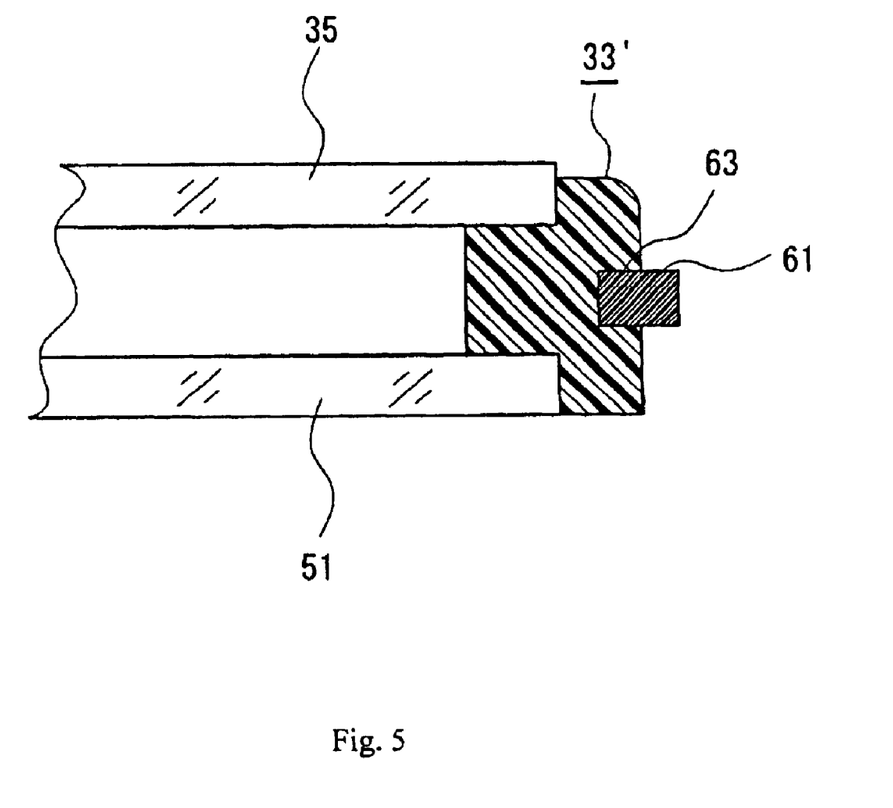
FIG. 5 shows a cross-sectional view of a portion of a fully assembled image-reading device that includes a casing of Embodiment 2 of the present invention with shock absorbing structures.
Figure 6:
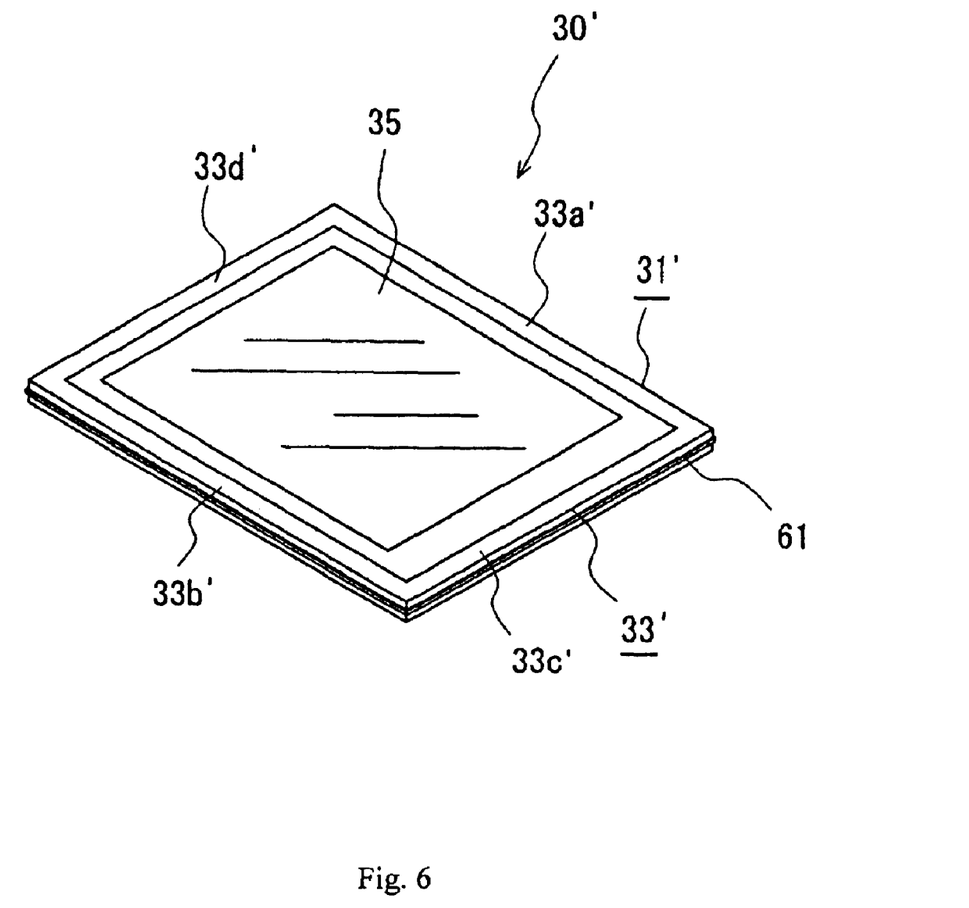
FIG. 6 shows a perspective view of the fully assembled image-reading device of FIG. 5.

A casing for an image-reading device according to Embodiment 2 of the present invention will be described with reference to FIGS. 5 and 6. FIG. 5 shows a cross-sectional view of a portion of a fully assembled image-reading device, that includes a casing of Embodiment 2 of the present invention with shock absorbing structures. FIG. 6 shows a perspective view of the fully assembled image-reading device 30' of FIG. 5. In Embodiment 2 of the present invention, the same reference symbols are used for components that are the same as in Embodiment 1 of the present invention.

Embodiment 2 is the same as Embodiment 1 of the present invention except that, as shown in FIGS. 5 and 6, the frame members include grooves 63 and shock absorbing members 61 are included. As shown in FIGS. 5 and 6, grooves 63 are formed in the outside center of each of the frame members 33a', 33b', 33c', and 33d' of the frame 33', and shock absorbing members 61 are inserted into these grooves 63. The shock absorbing members 61 have appropriate elasticity, for example, by being made of rubber, sponge, or similar resilient material. Because the shock absorbing members 61 extend around the entire outer side surfaces of the frame 33', if the image-reading device 30' is inadvertently dropped, for example, while being transported, the shock absorbing members 61 absorb the impact and protect the structure of the carriage 37 and other structures within the frame 33'. Accordingly, it is possible to prevent most damage to the performance and functionality, as well as the appearance, of the image-reading device 30' that might occur from dropping the image-reading device 30'. Additionally, by surrounding the frame 33' completely by the shock absorbing members 61, it is possible to solidify the mated status of the frame members 33a, 33b, 33c and 33d, which are formed separate from each other, and to further increase the rigidity of the frame 33' and thus the rigidity of the casing 31'. Thus the frame 33' includes shock absorbing means distributed evenly around the perimeter of the frame 33' on the frame members 33a', 33b', 33c', and 33d'.

Embodiment 3

Figure 7:
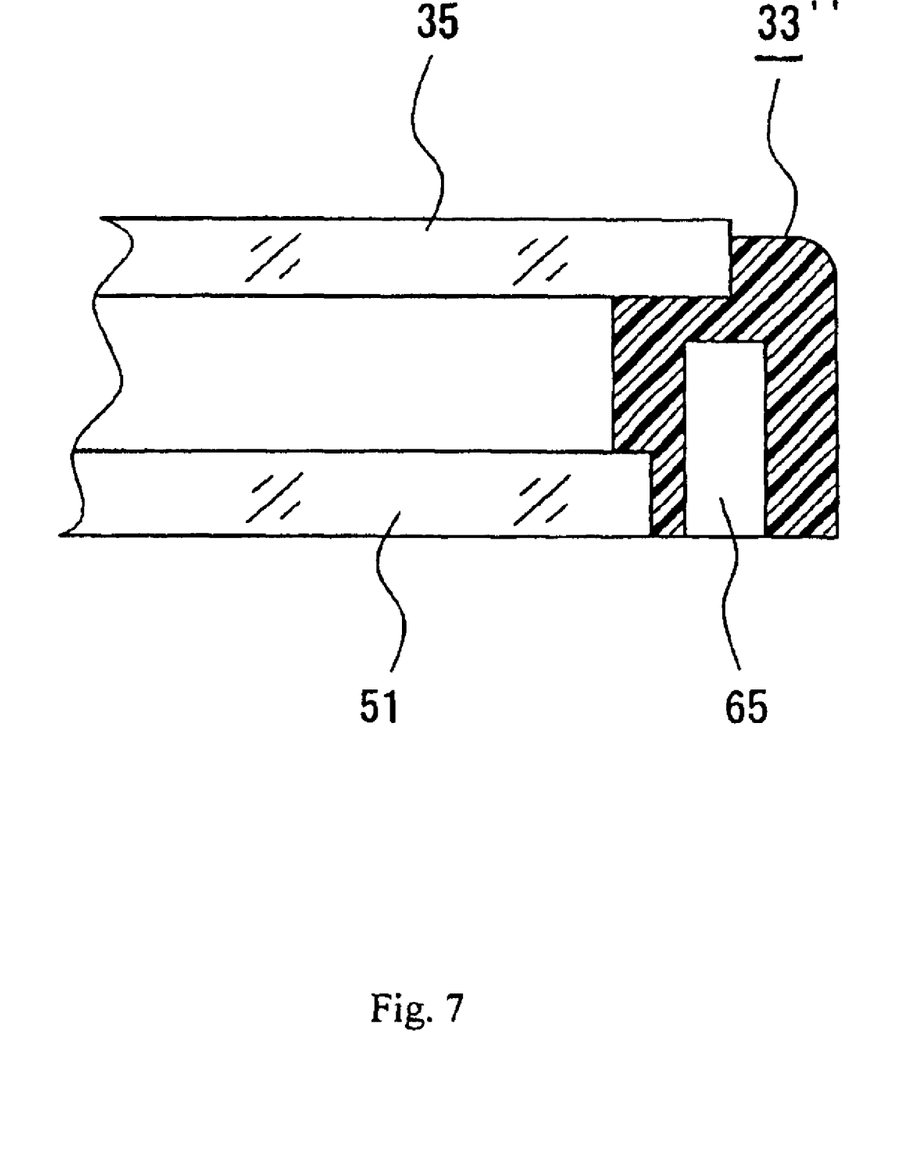
FIG. 7 shows a cross-sectional view of a portion of a fully assembled image-reading device that includes a casing of Embodiment 3 of the present invention with shock absorbing structures.

A casing for an image-reading device of Embodiment 3 of the present invention will be described with reference to FIG. 7, which shows a cross-sectional view of a portion of a fully assembled image-reading device that includes a casing according to Embodiment 3 of the present invention with shock absorbing structures. In Embodiment 3 of the present invention, the same reference symbols are used for components that are the same as in Embodiment 1 of the present invention.

Embodiment 3 is the same as Embodiment 1 of the present invention except that grooves 65 are placed in the bottoms of the frame members that form frame 33" closely adjacent to the outer sides surfaces of the frame 33" that may or may not be filled with resilient material. When the image-reading device is inadvertently dropped, the outside portion of these grooves 65 bend appropriately under the impact, thereby absorbing the shock and preventing to a large extent the impact being transferred to the structures inside the frame 33". If these grooves 65 are filled with sponge or some other shock absorbing material, the impact is even more effectively absorbed. Thus the frame 33" includes shock absorbing means distributed evenly around the bottom of the frame closely adjacent to the outer side surfaces of the frame 33" in the grooves 65 of the frame members. In addition, if the grooves 65 formed in the frame members are connected to each other, it is possible to wrap a shock absorbing material around the frame 33", thereby increasing the rigidity of the assembly of the frame members and the frame 33".

The invention being thus described, it will be obvious that the same may be varied in many ways. For example, although in the preferred embodiments, the frame is formed of four frame members, fewer or more frame members might be used. For example, two L-shape frame members may form the frame, or four corner L-shape members may be joined with four straight frame members to form the frame. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A casing for an image-reading device that includes an optical unit, the casing comprising:

a frame including a plurality of elongated frame members rigidly connected together to lie generally in a first plane with a top of the frame on one side of said first plane and a bottom of the frame on the other side of said first plane;

a guide rod extending between a pair of said frame members with one end of the guide rod fixed to one of each of the pair of frame members with the guide rod extending in said first plane;

a carriage for supporting the optical unit and connected to said guide rod for being guided by said guide rod in a direction in said first plane; and a base plate connected to the bottom of the frame so that it lies generally in a second plane that is parallel to said first plane.

2. The casing of claim 1, wherein the frame consists of four frame members.

3. The casing of claim 1, wherein the base plate is made of glass.

4. The casing of claim 2, wherein the base plate is made of glass.

5. The casing of claim 1, wherein the frame includes outer side surfaces and shock absorbing means are distributed evenly around the outer side surfaces or around the bottom of the frame closely adjacent to the outer side surfaces.

6. The casing of claim 2, wherein the frame includes outer side surfaces and shock absorbing means are distributed evenly around the outer side surfaces or around the bottom of the frame closely adjacent to the outer side surfaces.

7. The casing of claim 3, wherein the frame includes outer side surfaces and shock absorbing means are distributed evenly around the outer side surfaces or around the bottom of the frame closely adjacent to the outer side surfaces.

8. The casing of claim 1, wherein the frame includes an outer side on each of the frame members and each of the outer sides includes an elongated groove filled with resilient material so as to absorb shocks.

9. The casing of claim 2, wherein the frame includes an outer side on each of the frame members and each of the outer sides includes an elongated groove filled with resilient material so as to absorb shocks.

10. The casing of claim 3, wherein the frame includes an outer side on each of the frame members and each of the outer sides includes an elongated groove filled with resilient material so as to absorb shocks.

11. The casing of claim 1, wherein the frame members include bottoms that define the bottom of the frame and the bottoms of the frame members include elongated grooves that provide resiliency to the frame members so as to absorb shocks.

12. The casing of claim 2, wherein the frame members include bottoms that define the bottom of the frame and the bottoms of the frame members include elongated grooves that provide resiliency to the frame members so as to absorb shocks.

13. The casing of claim 3, wherein the frame members include bottoms that define the bottom of the frame and the bottoms of the frame members include elongated grooves that provide resiliency to the frame members so as to absorb shocks.

14. The casing of claim 1, wherein the frame members include bottoms that define the bottom of the frame and the bottoms of the frame members include elongated grooves that are filled with resilient material so as to absorb shocks.

15. The casing of claim 2, wherein the frame members include bottoms that define the bottom of the frame and the bottoms of the frame members include elongated grooves that are filled with resilient material so as to absorb shocks.

16. The casing of claim 3, wherein the frame members include bottoms that define the bottom of the frame and the bottoms of the frame members include elongated grooves that are filled with resilient material so as to absorb shocks.

17. A casing comprising:

a frame including a plurality of elongated frame members rigidly connected together to lie generally in a first plane with a top of the frame on one side of said first plane and a bottom of the frame on the other side of said first plane; and a base plate connected to the bottom of the frame so that it lies generally in a second plane that is parallel to said first plane;

wherein the frame includes outer side surfaces and shock absorbing means are distributed evenly around the outer side surfaces or around the bottom of the frame closely adjacent to the outer side surfaces.

18. The casing of claim 17, wherein the frame includes an outer side on each of the frame members and each of the outer sides includes an elongated groove filled with resilient material so as to act as said shock absorbing means.

19. The casing of claim 17, wherein the frame members include bottoms that define the bottom of the frame and the bottoms of the frame members include elongated grooves that provide resiliency to the frame members so as to act as said shock absorbing means.

20. The casing of claim 17, wherein the frame members include bottoms that define the bottom of the frame and the bottoms of the frame members include elongated grooves that are filled with resilient material so as to act as said shock absorbing means.

* * * * *